(12) United States Patent
Horst et al.

(10) Patent No.: US 9,436,570 B2
(45) Date of Patent: Sep. 6, 2016

(54) USER STATION OF A BUS SYSTEM AND METHOD FOR TRANSMITTING DATA BETWEEN USER STATIONS OF A BUS SYSTEM

(71) Applicants: Christian Horst, Dusslingen (DE); Florian Hartwich, Reutlingen (DE)

(72) Inventors: Christian Horst, Dusslingen (DE); Florian Hartwich, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 94 days.

(21) Appl. No.: 14/367,598

(22) PCT Filed: Dec. 20, 2012

(86) PCT No.: PCT/EP2012/076348
§ 371 (c)(1),
(2) Date: Jun. 20, 2014

(87) PCT Pub. No.: WO2013/092837
PCT Pub. Date: Jun. 27, 2013

(65) Prior Publication Data
US 2015/0301916 A1 Oct. 22, 2015

(30) Foreign Application Priority Data
Dec. 22, 2011 (DE) .......... 10 2011 089 586

(51) Int. Cl.
*G06F 11/30* (2006.01)
*H04L 1/20* (2006.01)
*G06F 11/34* (2006.01)

(52) U.S. Cl.
CPC ....... *G06F 11/3027* (2013.01); *G06F 11/3409* (2013.01); *H04L 1/203* (2013.01)

(58) Field of Classification Search
CPC ........... G06F 11/3027; G06F 11/3409; H04L 12/40013; H04L 12/413; H04L 12/417; H04L 1/0061; H04L 1/1671; H04L 1/1685; H04L 1/18; H04L 2012/40273; H04L 1/203
See application file for complete search history.

(56) References Cited

U.S. PATENT DOCUMENTS

| 5,874,992 A * | 2/1999 | Caporizzo .............. H04H 20/12 348/192 |
| 5,926,529 A * | 7/1999 | Hache ..................... H04M 1/66 379/114.14 |
| 6,795,941 B2 * | 9/2004 | Nickels ..................... H04L 1/20 709/224 |
| 2002/0083378 A1 * | 6/2002 | Nickels ..................... H04L 1/20 714/704 |

(Continued)

FOREIGN PATENT DOCUMENTS

| CA | 1305524 | 7/1992 |
| DE | 100 00 305 | 7/2001 |

OTHER PUBLICATIONS

International Search Report for PCT/EP2013/076348, dated Mar. 13, 2013.

(Continued)

*Primary Examiner* — Nadeem Iqbal
(74) *Attorney, Agent, or Firm* — Norton Rose Fulbright US LLP

(57) ABSTRACT

A user station of a bus system includes: a counter for counting each message which is sent without error and/or each message which is received without error, the counter being incremented when a message is sent without error and/or a message is received without error, and a reset device for resetting the counter reading of the counter when the counter reading of the counter is read.

10 Claims, 3 Drawing Sheets

(56) References Cited

U.S. PATENT DOCUMENTS

2003/0084384 A1* 5/2003 White, III ................. H04L 1/08
714/704
2006/0125611 A1* 6/2006 Schmid ................ G08B 29/185
340/438

OTHER PUBLICATIONS

Gaujal, B., et al. "Fault Confinement Mechanisms on CAN: Analysis and Improvements", IEEE Transactions on Vehicular Technology, Bd. 54, No. 3, May 1, 2005, pp. 1103-1113.
I. Bernsdorf, T. et al. "CAN-BUS/Ausarbeitung zum CAN-Bus WS 09/10", Prof. Dr. Ing., Nov. 6, 2009, pp. 1-42.
"CAN-Controller Area Network", University of Magdeburg, Mar. 30, 2000, pp. 1-26.
"Introduction to CAN", Renesas Electronics Corp, Apr. 7, 2006, pp. 1-44.
Robert Boys: "CAN Primer: Creating your own Network (Version 1.01)", Jun. 19, 2009, pp. 1-14.
A. Albert, W. Gerth: "Evaluation and Comparison of the Real-Time Performance of CAN and TTCAN", $9^{th}$ International CAN Conference, ICC 2003,Munich, Oct. 14, 2003.
Prof. Dr. Ing. Konrad Etschberger: "Comparing CAN- and Ethernet-based Communication", IXXAT Automation GmbH, 88250 Weingarten, Jan. 14, 2005, pp. 1-3.
"PCAN-Diag 2, Handbuch zur CAN-Bus-Diagnose, Benutzerhandbuch v2.3.1", Peak-System Technik GmbH, Mar. 5, 2012, pp. 1-107.
Nicholas Navet, Herve Perbault: "CAN in Automotive Applications: a Look Forward", $13^{th}$ International CAN Conference, ICC 2012, Mar. 5, 2012, pp. 1-6.

* cited by examiner

USER STATION OF A BUS SYSTEM AND METHOD FOR TRANSMITTING DATA BETWEEN USER STATIONS OF A BUS SYSTEM

BACKGROUND OF THE INVENTION

1. Field of the Invention

The present invention relates to a user station of a bus system and to a method for transmitting data between user stations of a bus system, in which in particular the bus load of the bus system is easily trackable.

2. Description of the Related Art

At present, a bus system is known in which messages are transmitted with the aid of the CAN protocol, as it is described in the CAN specification in ISO 11898.

Published German patent application document DE 100 00 305 A1 describes the Controller Area Network (CAN) and an extension of the CAN referred to as time-triggered CAN (TTCAN).

CAN and TTCAN operate with a message-based protocol and are used in vehicles, for example. A CAN-based or TTCAN-based bus system allows all user stations, such as microcontrollers, connected thereto to communicate with each other.

The CAN protocol provides a transmit error counter and a receive error counter for error handling. Error conditions increment the error counters, successful transmitting or receiving decrement the counters. The counter readings of the transmit error counter and of the receive error counter influence the error status of the CAN controller, which may also be referred to as CAN control unit. For example, the CAN controller transitions into the "error passive" state at a counter reading of the transmit error counter of 128 or more. At a counter reading of the transmit error counter of 256 or more, the CAN controller transitions into the "BusOff" state. In addition to the transmit error counter and the receive error counter, a CAN controller may also have an error logging counter. This counter is incremented when a CAN protocol error increments the transmit error counter or the receive error counter. Reading of the error logging counter resets the error logging counter. The counter reading of the counter logging counter displays the sum of the CAN protocol errors which have occurred since the last reading.

In conventional CAN controllers, the successful transmission of a message is signaled by setting a TxOK status bit, for example. In contrast, the successful receipt of a message is signaled by setting an RxOK status bit, for example. However, this allows no direct statement about the present bus load.

BRIEF SUMMARY OF THE INVENTION

It is therefore the object of the present invention to provide a user station of a bus system and a method for transmitting data between user stations of a bus system, which allow the CAN bus load on the bus to be tracked in a simple manner.

The user station includes a counter for counting each message which is sent without error and/or received without error, the counter being incremented when a message is sent without error and/or a message is received without error, and a reset device for resetting the counter reading of the counter when the counter reading of the counter is read.

The described user station allows the bus load, in particular the CAN bus load, to be ascertained based on the counter reading of the counter. Within the scope of a network management, statements may thus be made about the state of the bus system, in particular of the CAN bus system, and of the bus system controllers connected thereto, in particular of the CAN controllers.

The user station additionally preferably has a further counter for counting each message which is received without error, the counter being designed to only count each message which is sent without error, and the reset device being designed to reset the counter and/or the further counter when the counter reading of the particular counter is read. Due to the presence of two counters, the bus load is ascertainable even more precisely. Additionally, more precise statements about the state of the user station, more precisely about its CAN controller, are possible.

The user station additionally preferably includes a counter reading read device for reading out the counter reading of the counter or of the further counter, the counter reading read device being designed to reset a counter reading of the counter or of the further counter when it reads out the counter's reading.

It is possible for the user station to be additionally configured with an evaluation device for evaluating the counter reading read out by the counter reading read device.

It is advantageous that the user station includes an evaluation device for ascertaining the bus load of a bus of the bus system based on a time interval between read accesses of the counter reading read device, the counter reading of the counter or of the further counter, and a time duration of the messages on the bus.

It is also possible for the evaluation device, for the purpose of ascertaining the user station, to be designed in such a way that it establishes whether send messages of the user station are blocked by messages having a higher priority which are sent by a further user station. It is thus possible to ascertain whether a reconfiguration of the user station connected to the CAN bus is required to achieve that all messages reach their recipient.

The evaluation device may also be designed to ascertain whether the quotient of the counter reading of the counter divided by the sum of the counter reading of the counter and the counter reading of the further counter is smaller than a predetermined expected value.

Advantageously, the user station outputs an error message when the evaluation of the evaluation device shows that the sum of the counter readings of the counters in one user station is different from the sum of the counter readings in a further user station.

The user station additionally preferably has an error logging counter for counting detected errors, the evaluation device being designed to ascertain whether the counter reading of the error logging counter is lower than the counter reading of the counter or of the further counter.

The method includes the steps of counting, with the aid of the counter, each message which is sent without error and/or received without error, the counter being incremented when a message is sent without error and/or a message is received without error, and resetting the counter reading of the counter with the aid of a reset device when the counter reading of the counter is read.

Further possible implementations of the present invention also include not explicitly described combinations of features or specific embodiments which are described at the outset or hereafter with respect to the exemplary embodiments. Those skilled in the art will also add individual

DETAILED DESCRIPTION OF THE INVENTION

Figure 1:
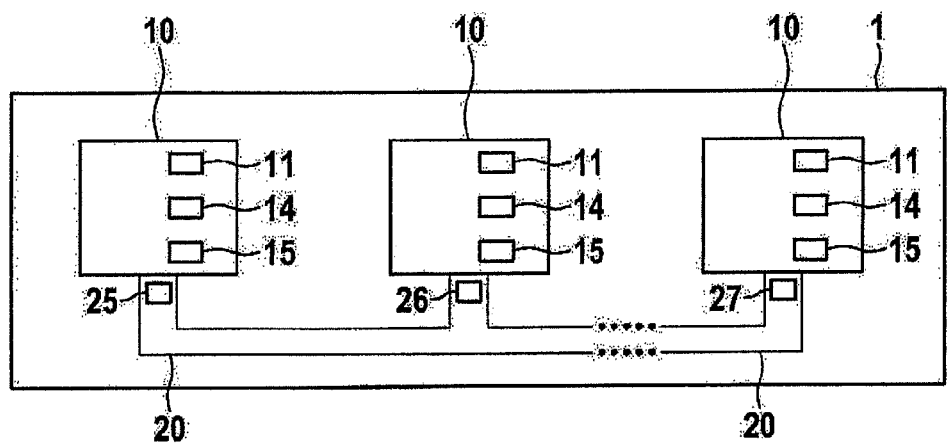
FIG. 1 shows a simplified block diagram of a bus system according to a first exemplary embodiment.

In the figures, identical or functionally equivalent elements are denoted by the same reference numerals, unless indicated otherwise.

FIG. 1 shows a bus system 1, which may be a CAN bus system, for example, which may be used in a vehicle, in particular a motor vehicle, an airplane, and the like, or in a hospital and the like. Bus system 1 has a plurality of user stations 10, which are each connected to a bus 20. Messages 25, 26, 27 are transmittable between individual user stations 10 via bus 20. User stations 10 may be control units or display devices of a motor vehicle, for example.

In FIG. 1, each of user stations 10 includes a counter 11, a counter reading read device 14 and an evaluation device 15. Counter 11 is used to count messages 25 sent without error and messages 25 received without error. Counter reading read device 14 is used to read and then to reset the counter reading of counter 11 to its initial value, for example zero. Counter reading read device 14 thus has the function of a read device and of a reset device. Evaluation device 15 is used to evaluate the counter reading of counter 11 read by counter reading read device 14.

Figure 2:
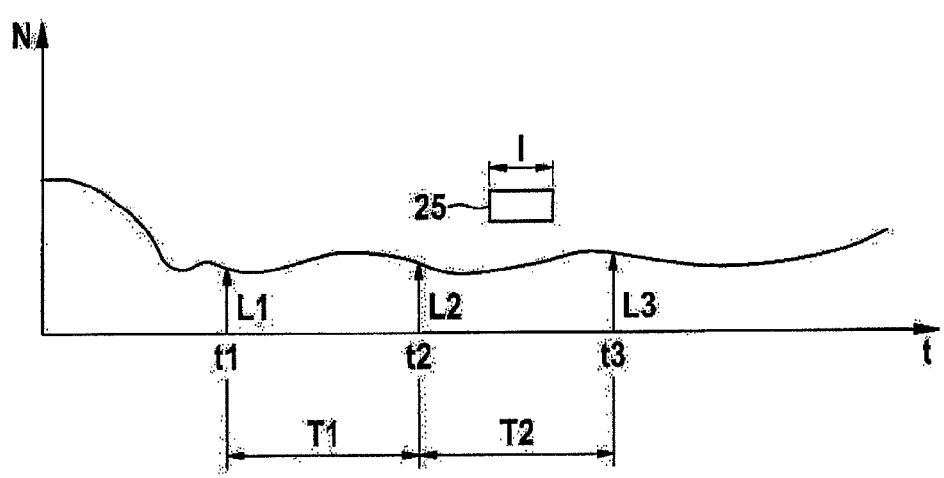
FIG. 2 shows a diagram to illustrate the number of messages N over time t in the bus system of FIG. 1.

FIG. 2 shows a diagram to illustrate the number N of messages 25, 26, 27 over time t as one example. In addition, the diagram of FIG. 2 shows one message 25 to illustrate a time duration I of message 25 on bus 20. At time t1, a read access L1 to counter 11 takes place. At time t2, a read access L2 to counter 11 takes place. At time t3, a read access L3 to counter 11 takes place. Read accesses L1, L3, L3 are depicted as an arrow in each case in FIG. 2. Time period T1 between point in time t1 and point in time t2 and time period T2 between points in time t2 and t3 are identical in FIG. 2. Based on this, evaluation device 15 is able to determine the time interval between read accesses L1, L2, L3 to counter 11, which corresponds to time periods T1 or T2, as t2-t1 or t3-t2. Time periods T1 and T2 are preferably identical, as shown in FIG. 2. Message 25 is sent in FIG. 2 after point in time t2 and has already ended before point in time t3. Time duration I of message 25 in FIG. 2 is thus shorter than time period T2.

Time duration I of messages 25 is preferably identical for all messages 25. In addition, time duration I of messages 26 and/or of messages 27 may be identical to time duration I of messages 25. However, time duration I of messages 25, 26, 27 may also be different.

Figure 3:
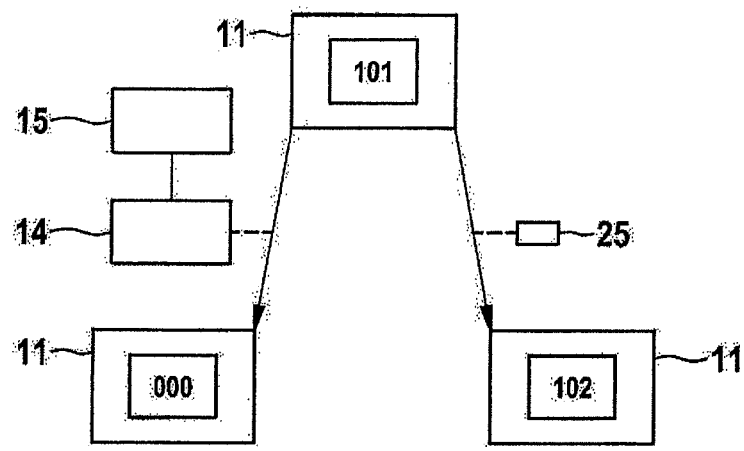
FIG. 3 shows a view to illustrate the operating mode of a counter according to the first exemplary embodiment.

FIG. 3 shows the incrementing and decrementing counter 11. This means that when a message 25 or 26 or 27 is sent or received without error by one of user stations 10, counter 11 of this user station 10 is increased by one; in other words, it is incremented. In FIG. 3, counter 11 initially has the counter reading 101 and transitions to counter reading 102 after message 25 was sent without error or correctly, or received without error or correctly, as is shown in the right portion of FIG. 3. However, if counter 11 having counter reading 101 is read out with the aid of counter reading read device 14, counter reading read device 14 resets counter 11 to counter reading "000," as shown in the left portion of FIG. 3. If the counter reading of counter 11 is read out by counter reading read device 14, evaluation device 15 is able to evaluate the counter reading of counter 11 read out by counter reading read device 14.

Figure 4:
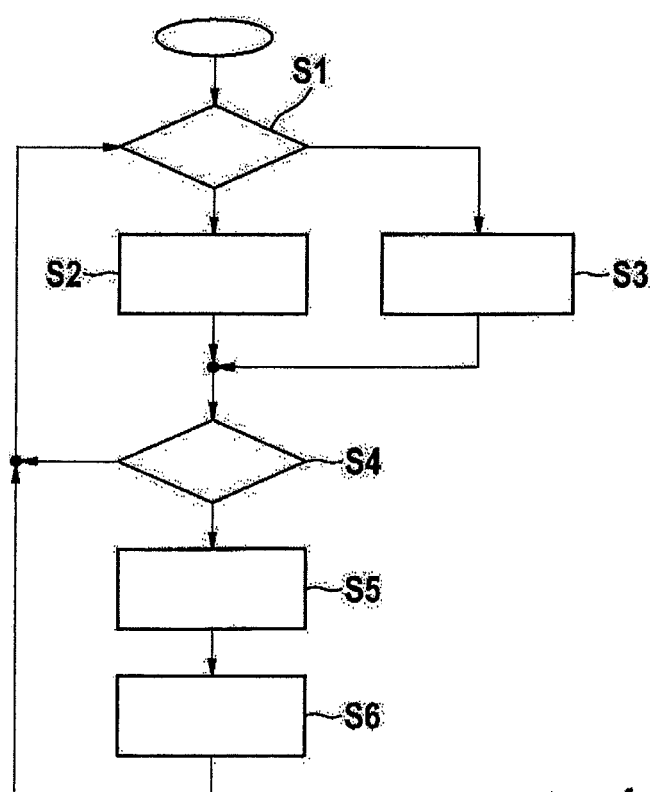
FIG. 4 shows a flow chart of a method according to the first exemplary embodiment.

FIG. 4 shows a flow chart of the function of counter 11 which was already described with reference to FIG. 3. The flow chart shows the function in a method for transmitting data between user stations 10 of bus system 1. After the method is started, it is checked in a step S1 whether a message 25 was sent or received correctly by a user station 10.

If the response in step S1 is YES, the flow continues to a step S2. In step S2, counter 11 is incremented by one.

In contrast, if the response in step S1 is NO, the flow continues to a step S3. In step S3, the counter reading of counter 11 is not changed.

After step S2 and step S3, the flow continues to step S4.

In step S4, it is checked whether or not the counter reading of counter 11 is to be read out. This check preferably has the response YES at regular intervals. This means that it may be checked whether or not a predetermined duration has lapsed.

If the response in step S4 is YES, the flow continues to step S5. In step S5, the counter reading of counter 11 is read out with the aid of counter reading read device 14, and additionally counter 11 is reset to its initial value. After step S5, which is carried out in each case at regular intervals, i.e., time periods T1, T2, the flow continues to step S6.

In contrast, if the response in step S4 is NO, the flow returns directly to step S1.

In step S6, evaluation device 15 evaluates the read-out counter reading of counter 11. This means that, based on the counter reading of counter 11, which was read out in step S5, evaluation device 15 is able to ascertain the load on bus 20 from time interval T1, T2 of read accesses L1, L2, L3 to counter 11 and the temporal number I of messages 25 on bus 20. After step S6, which like step S5 is carried out at regular intervals, the flow returns to step S1.

The method is ended when the power supply of bus system 1 is interrupted.

The above-described functions may be implemented in a communication software of bus system 1.

Figure 5:
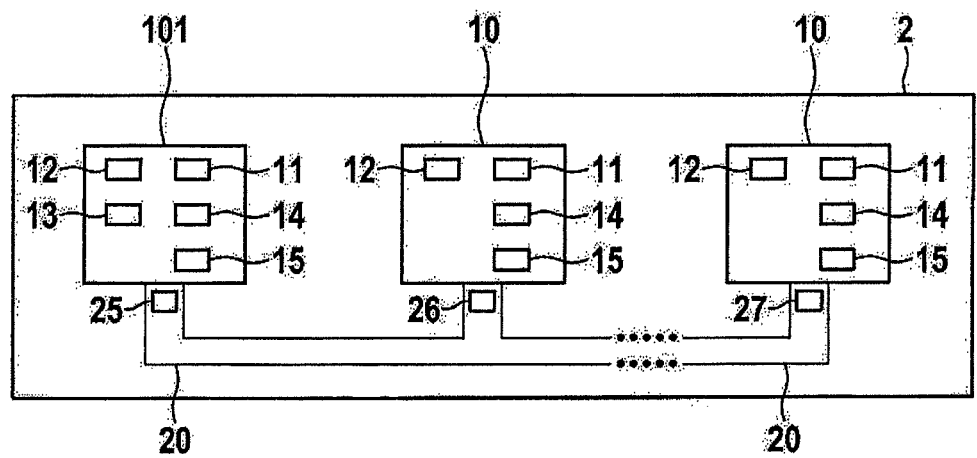
FIG. 5 shows a simplified block diagram of a bus system according to a second exemplary embodiment.

FIG. 5 shows a bus system 2 according to a second exemplary embodiment. Bus system 2 of the second exemplary embodiment is largely implemented the same way as bus system 1 of the first exemplary embodiment. As a result, only the differences between the first and second exemplary embodiments are described hereafter. Otherwise, reference is made to the description of the first exemplary embodiment.

Contrary to the first exemplary embodiment, each user station 10, 101 of bus system 2 of the second exemplary embodiment has one further counter 12, in addition to counter 11. Moreover, one of the user stations, which in FIG. 5 is user station 101, additionally has an error logging counter 13.

In this exemplary embodiment, counter 11 is used to count each message 25 or 26 or 27 which is sent without error by user station 10, 101. This means that counter 11 is only incremented by one if messages 25 or 26 or 27 are sent without error by the particular user station 10, 101. In contrast, further counter 12 is incremented after each message 25 which is received without error by the particular user station 10, 101. This means that further counter 12 is in each case incremented by one when messages 25 or 26 or 27 are received. Counter 11 and further counter 12 are reset by being read out with the aid of counter reading read device 14.

In a bus system 2 operating without errors, the sum of the two counter readings are the same in each user station 10 and user station 101. The quotient of the counter reading of counter 11/(the counter reading of counter 11+the counter reading of further counter 12) may be used to ascertain whether the send messages of associated user station 10, 101 are blocked by messages 25 or 26 or 27 having a higher priority which were sent by other user stations 101, 10. This is the case when the quotient is smaller than a predetermined expected value. This ascertainment may be carried out by one of evaluation devices 15 of bus system 1.

If the sum of counter readings of counter 11 and of further counter 12 is not the same in each user station 10, 101, it is possible to ascertain a temporarily or permanently disrupted user station 10, 101 and display it by an error message. This ascertainment may be carried out by one of evaluation devices 15 of bus system 1.

Error logging counter 13 in FIG. 5 is incremented when a protocol error of bus system 1 increments a transmit error counter (not shown) or a receive error counter. The counter reading of error logging counter 13 displays the sum of protocol errors which occurred since the last reading on bus 20.

Together with error logging counter 13, the ratio of detected errors to successfully sent or received messages 25 or 26 or 27 is then ascertainable. A high counter reading of error logging counter 13 at a low counter reading of counter 11 or of further counter 12 is an indication of a disrupted user station 10, 101. This may also be evaluated by one of evaluation devices 15 of bus system 1, preferably, however, by evaluation device 15 of user station 101.

Figure 6:
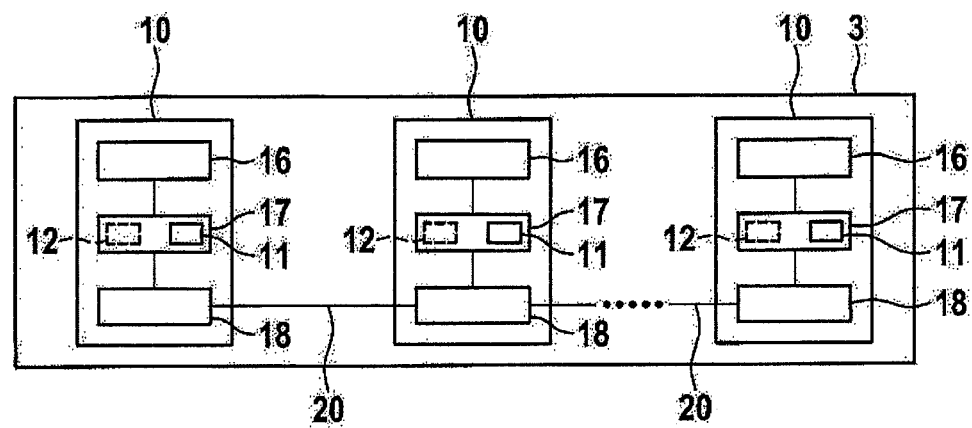
FIG. 6 shows a block diagram of a bus system according to a third exemplary embodiment.

FIG. 6 shows a block diagram of a bus system 3 according to a third exemplary embodiment. In this exemplary embodiment, each user station 10 has a microcomputer 16, which is connected to a bus control unit 17, in particular a CAN controller 17. CAN controller 17 is able to communicate with a bus transceiver device 18, in particular a CAN transceiver device 18 referred to as CAN transceiver, which is connected to bus 20. In this exemplary embodiment, counter 11 is part of bus control unit 17. If counter 11 is designed to count messages 25 sent and received without error by user station 10, more precisely by transceiver device 18, no further counter 12 is present, as in the first exemplary embodiment. However, if further counter 12 is also present, as in the second exemplary embodiment, counter 11 and further counter 12 are designed as described in the second exemplary embodiment. All above-described embodiments of user stations 10, 101 and of the method may be used individually or in all possible combinations. Additionally, in particular the following modifications are conceivable.

Above-described bus system 1, 2, 3 according to the first through third exemplary embodiments is described based on a bus system operating based on the CAN protocol. However, bus system 1, 2, 3 may also be another type of communication network. It is advantageous, but not necessarily a prerequisite, that an exclusive, clash-free access of a user station 10 to a shared channel is ensured in bus system 1, 2, 3 at least for certain time periods.

Bus system 1, 2, 3 according to the first through third exemplary embodiments is in particular a CAN network or a TTCAN network or a CAN FD network.

The number of user stations 10 in bus systems 1, 2, 3 of the first through third exemplary embodiments is arbitrary.

It is also possible for the counter reading of counter 11 to be reset to its initial value, for example zero, by a separate reset device without the counter reading of counter 11 being read out.

Counter reading read device 14 and evaluation device 15 are preferably also part of bus control unit 17. Moreover, error logging counter 13 may also be part of bus control unit 17.

What is claimed is:

1. A user station of a bus system, comprising:
a first counter configured to be incremented responsive to each message that is sent without error and not in response to messages received without error;
a second counter configured to be incremented responsive to each message that is received without error;
a counter-reading and reset device configured to, for each of at least one of the first counter and the second counter, (a) read out a counter reading of the respective counter and (b), responsive to the read out, reset the counter reading of the respective counter; and
an evaluation device configured to evaluate the counter reading read out by the counter-reading and reset device;
wherein at least one of:
the evaluation device is configured to ascertain whether sent messages of the user station are blocked by messages of a higher priority which are sent by a further user station;
the evaluation device is configured to ascertain whether a quotient of (i) the counter reading of the first counter divided by (ii) a sum of the counter readings of the first and second counters is smaller than a predetermined expected value; and
the user station is configured to output an error message when the evaluation device determines that the sum of the counter readings of the first and second counters in the user station is different than a sum of counter readings of first and second counters in the further user station.

2. The user station as recited in claim 1, wherein the evaluation device is configured to ascertain a bus load of a bus of the bus system based on (i) a time interval between read accesses of the counter-reading and reset device, (ii) a counter reading of the at least one of the first counter and the second counter, and (iii) a time duration of messages on the bus.

3. The user station as recited in claim 1, wherein the evaluation device is configured to ascertain whether the sent messages of the user station are blocked by messages of the higher priority which are sent by the further user station.

4. The user station as recited in claim 1, wherein the evaluation device is configured to ascertain whether the quotient is smaller than the predetermined expected value.

5. The user station as recited in claim 1, wherein the user station configured to output the error message when the evaluation device determines that the sum of the counter readings of the first counter and the second counters in the user station is different than the sum of the counter readings of the first and second counters in the further user station.

6. The user station as recited in claim 1, further comprising:
an error logging counter for counting detected errors, wherein the evaluation device is configured to ascertain whether a counter reading of the error logging counter is lower than the counter reading of one of the first counter and second counters.

7. A method for managing data transmissions and receptions of a user station of a bus system, the method comprising:
incrementing, by a first counter in the user station, a first count responsive to each message that is sent without error and not in response to messages received without error;
incrementing, by a second counter in the user station, a second count responsive to each message that is received without error;
for each of at least one of the first counter and the second counter, a counter-reading and reset device (a) reading out a counter reading of the respective counter and (b), responsive to the read out, resetting the counter reading of the respective counter;
evaluating, by an evaluation device, the counter reading read out by the counter-reading and reset device; and
at least one of:
ascertaining, by the evaluation device, whether sent messages of the user station are blocked by messages of a higher priority which are sent by a further user station;
ascertaining, by the evaluation device, whether a quotient of (i) the counter reading of the first counter divided by (ii) a sum of the counter readings of the first and second counters is smaller than a predetermined expected value; and
outputting, by the user station, an error message when the evaluation device determines that the sum of the counter readings of the first and second counters in the user station is different than a sum of counter readings of first and second counters in the further user station.

8. The method as recited in claim 7, wherein whether the sent messages of the user station are blocked by messages of the higher priority which are sent by the further user station is ascertained.

9. The method as recited in claim 7, wherein whether the quotient is smaller than the predetermined expected value is ascertained.

10. The method as recited in claim 7, wherein the outputting is performed.

\* \* \* \* \*